Feb. 5, 1924.                                                          1,482,401
                       W. L. KENFIELD
            AUTOMATIC STOPPING MECHANISM FOR MACHINE TOOLS
                     Filed March 20, 1919           2 Sheets-Sheet 2
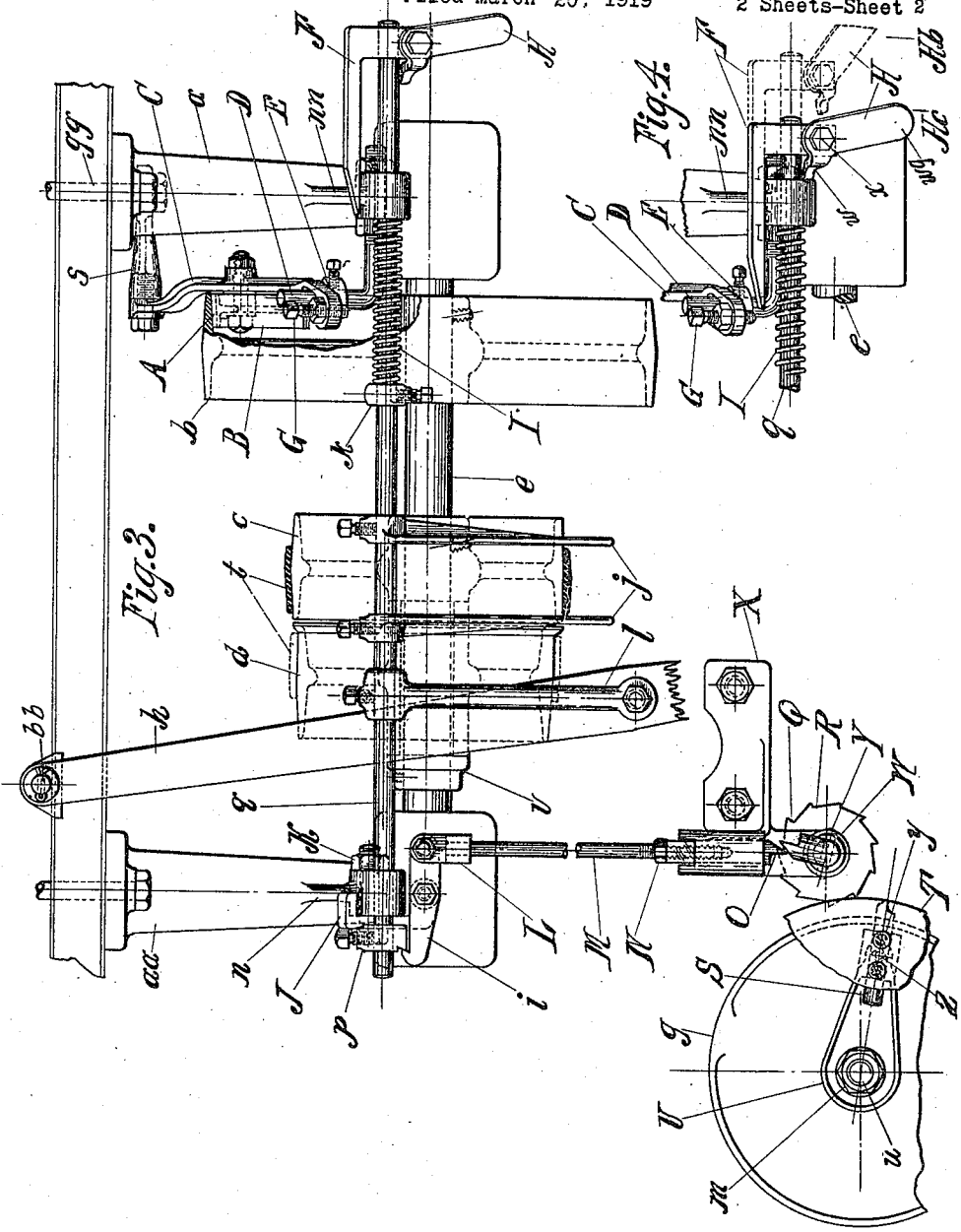

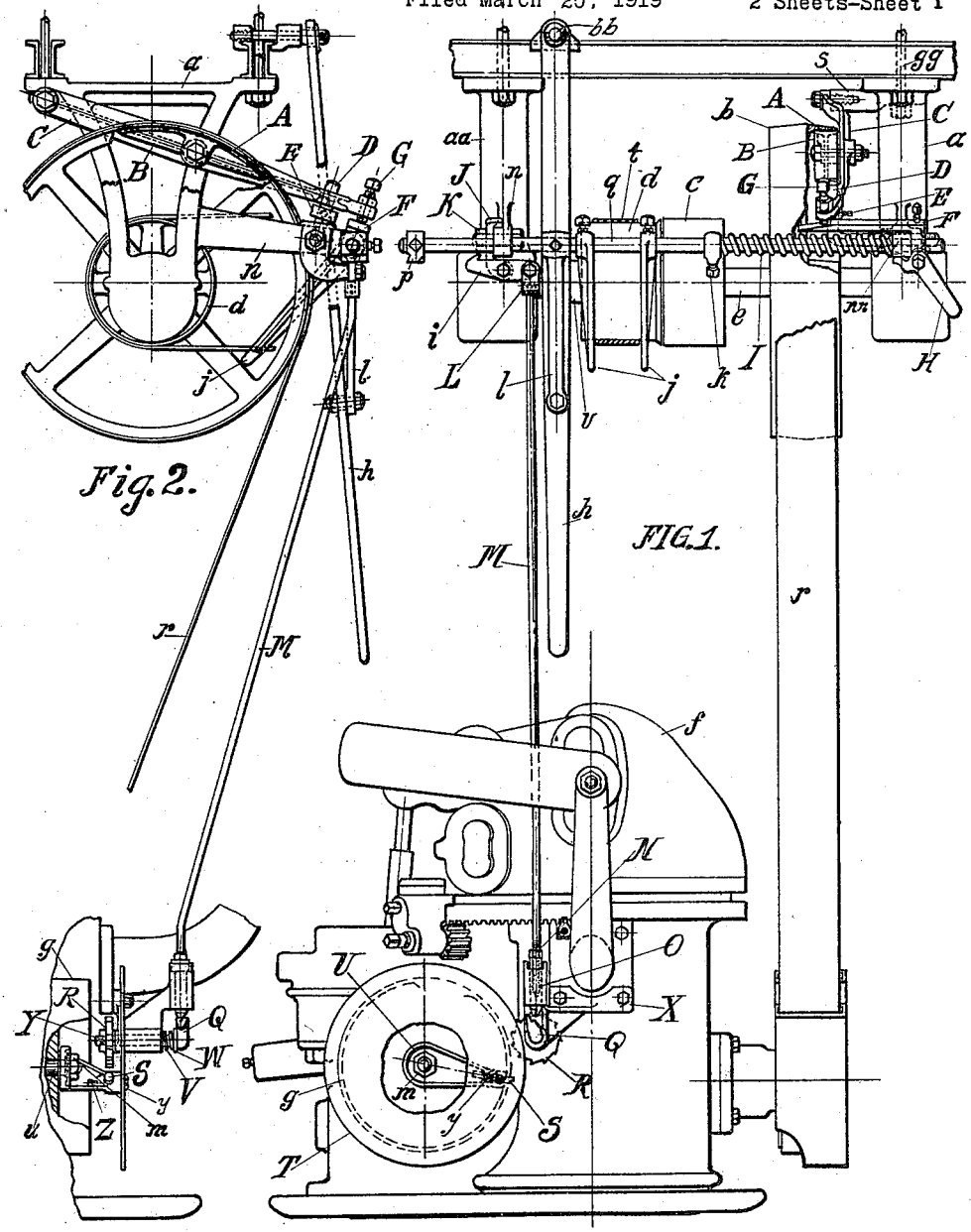

Patented Feb. 5, 1924.

1,482,401

UNITED STATES PATENT OFFICE.

WILLIAM L. KENFIELD, OF ROYAL OAK, MICHIGAN.

AUTOMATIC STOPPING MECHANISM FOR MACHINE TOOLS.

Application filed March 20, 1919. Serial No. 283,914.

*To all whom it may concern:*

Be it known that I, WILLIAM L. KENFIELD, a citizen of the United States, residing at Royal Oak, in the county of Oakland and State of Michigan, have invented a useful Automatic Stopping Mechanism for Machine Tools, of which the following is a specification.

This invention relates to automatic stopping mechanism for machine-tools and the object of the invention is to provide a mechanism connected to a machine-tool which will automatically stop the machine-tool at the completion of an operation thereof. A further object of the invention is to provide an automatic mechanism connected to the machine-tool which will automatically stop the machine-tool subsequent to a predetermined number of minor operations thereof. An additional object of the invention is to provide a mechanism of the character described by which a machine-tool is stopped and locked in the stopped position subsequent to operation thereof and provided with means for unlocking the stopping mechanism to allow adjustment of the machine-tool. These objects and the several novel features of the invention are hereinafter more fully described and claimed and the preferred form of construction is shown in the accompanying drawings in which:

Fig. 1 is an elevation of the device as arranged for use with a gear cutting machine or the like.

Fig. 2 is a side elevation of Fig. 1 showing only part of the machine-tool.

Fig. 3 is an enlarged view similar to Fig. 1 showing the position assumed by the mechanism when the machine-tool is being driven.

Fig. 4 is a detail of the means for releasing the brake when the machine-tool is stopped.

For convenience of description the mechanism may be divided into two parts, namely: the belt shifting and machine-tool locking mechanism as shown applied to the machine drive and the timing and controlling mechanism which is shown mounted on a gear cutting machine or the like. These two parts are connected together by the vertically extending rod M.

As shown in Figs. 1, 2, and 3 a pair of counter shaft hangers *a* and *aa* are provided which carry the counter shaft parts including the shaft *e*, the fixed pulley *c* secured thereto and rotatable therewith, the pulley *b* which is connected to the machine-tool by the belt *r* and provides a driving means for the machine, the loose pulley *d* which is rotatable on the shaft *e*, and the thrust collar *v* which positions the pulley *d* on the shaft. As shown in Fig. 1, a belt *t* is provided on the pulley *d*, which is freely rotatable on the shaft and the said belt *t* is connected to a power or line shaft and is continuously driven thereby. When the belt *t* is on the pulley *d* rotatable on the shaft *e* the machine drive is in what is termed its idling position, the machine-tool and stop mechanism remaining stationary, the pulley *d* being the only part of the mechanism shown which rotates in such position. When the belt *t* has been moved onto the pulley *c* secured to the shaft *e* the machine-tool and mechanism is set in motion and continuously operates until the belt *t* has been returned to the idling pulley *d*. Mounted in brackets or arms *n* and *nn* is a slidable rod *q* which is provided with belt guides *j* thereon for shifting the belt and also on the said rod *q* is a yoke *l* secured thereto by a set screw at one end and pivotally secured to the belt shifting lever *h* at the other end as shown in Figs. 1, 2, and 3. The lever *h* is pivoted on the countershaft hanger framework at *bb*. About the rod *q* is a coiled compression spring I which extends between the bracket or arm *nn* and a collar *k* which is secured to the rod *q* at a predetermined point by a set screw as shown which provides a means of adjusting the tension of the spring I. A collar *p* is also secured to the said rod *q* adjacent the end thereof by a set screw and the said collar is provided with a notch in the face thereof as shown more particularly in Figs. 1 and 3 which is adapted to be engaged by the notched end of the lever *i* as shown more particularly in Fig. 3. The lever *i* is pivoted to the bracket J on the arm *n* and secured to the end thereof by means of the clevis L is a vertically extending rod M which is connected to the machine. As will be noted from Figs. 1 and 3 movement of the belt shifting lever *h* compresses the spring I and as the lever is moved from the position shown in Fig. 1 to that shown in Fig. 3 the collar is moved over the end of the lever *i* and engaged thereby preventing a return of the rod *q* by the compressed spring I. Also by this means the belt $t$ or driving belt is moved from the idling pulley $d$ to the driving pulley $c$ and it will be noted by tripping the lever $i$ and releasing the collar $p$ that the rod $q$ is returned to the position shown in Fig. 1 by action of the compressed spring I. Within the pulley $b$ I provide a brake shoe B which conforms in shape to the inner surface of the pulley rim. The shoe B is pivotally secured to a lever C which is pivoted at one end to the bracket $s$ which is secured to the hanger $a$ by the bolt $gg$. At the opposite end of the lever C is an adjustable lock screw G the bearing point of which is adapted to ride upon a cam or wedge F which is secured on the end of the rod $q$ opposite the collar $p$. Mounted in the bracket $nn$ is a guide rod D which is bent up at the end thereof and which passes through a slot in the lever C and prevents horizontal movement of the lever C when the cam F is forced thereunder. The rod D is also provided with a collar E thereon to prevent downward movement of the lever C which holds the lever in position and holds the brake pad A close to the inner face of the rim of the pulley $b$.

The brake mechanism is designed to operate in sequence with the shifting of the belt drive to its idling position so that it may not retard the drive itself but rather overcome the momentum of the machine after the drive has been shifted to the said idling position. The object of the brake is to prevent further motion of the machine-tool after the operation has been completed. The cam F is secured to the rod $q$, so that the cam surface thereof is adapted to engage beneath the end of the lock screw G while the machine drive is in its idling position shown in Fig. 1, the engagement of the cam F beneath the said screw G applying the brake to the inner side of the rim of the pulley $b$ and thereby stopping the machine-tool. Sufficient space is allowed between the edge of the belt $t$ shown in Fig. 1 and the edge of the driving pulley $c$ so that the brake may be disengaged without starting the machine. The object of the disengaging the brake is to allow the operator to adjust the machine by moving the belt $r$ by hand. To disengage the brake the operator moves the hand-lever $h$ to the position shown in Fig. 4 which moves the rod $q$ and members thereon to the position shown in the said figure. The belt $t$ is then at the position shown in dotted lines in Fig. 3. In order to maintain the position of the cam F shown in Fig. 4, a latch H is provided pivoted to the member F and it is to be noted that the latch is provided with a pawl end $w$ arranged to engage against the end of the arm $nn$. The lower end $wg$ of the latch H is weighted to overbalance the pawl end and the pawl is held in engagement with the arm $nn$ by the said weighted end and it is also to be noted that the force of the spring I holds the said pawl in engagement with the said arm $nn$.

As hereinbefore described pivoted to the counter shaft hanger $aa$ I provide a lever $i$ having a notch in one end thereof and secured to the other end thereof is a clevis L to which is secured the rod M. On the rod $q$ is the collar $p$ which is notched to receive the notched end of the lever $i$ as shown in Fig. 3. When the rod $q$ is moved to position shown in Fig. 3 the collar $p$ slides over the lever $i$ and is engaged thereby the weight of the rod M tending to force the notched end of the lever $i$ upward and into engagement with the collar $p$. The rod M at its lower end extends through a boss or a bracket X secured to the machine-tool $f$. The dog $p$ may be released by upward movement of the rod M as will be understood from Fig. 3 whereupon the rod $q$ is forced to the position shown in Fig. 1 by the compressed spring I which shifts the belt $t$ onto the idling pulley $d$ and moves the cam F into engagement with the screw G on the lever C thereby stopping the machine by the brake B and locking it in position. During the said automatic movement the latch H on acount of the inertia of its weighted end takes the position shown at H$b$ in dotted lines in Fig. 4 as the rod is moved quickly to the left by the compression spring I. By this inertia and movement of the latch H the pawl $w$ thereon, owing to the position assumed by the inertia of the said weighted end, is positioned to pass by the arm $nn$ to the position shown in Fig. 1.

In the foregoing description I have endeavored to show the design and action of that part of the machine which is applied to the countershaft and which I have termed the belt shifting device. In order to make this mechanism effective, and in furtherance of the object of the invention, a timing device automatically controlled by the machine is provided for tripping the lever $i$. This device is mounted on a machine-tool and is actuated by some part thereof adapted to time the tripping of the said lever $i$ with the completion of the operation. The operation may consist of a plurality of minor operations as in the case of a gear cutting machine where the minor operation consists of cutting and indexing each individual tooth of the gear, while the whole number of these minor operations make up the complete operation.

In the drawings Figs. 1, 2, and 3 show a mechanism which is used to count off the minor operations by means of a pawl and ratchet, the pawl being attached to a part of the machine which moves in a cycle to operate the tool, the pawl being connected to this mechanism with a ratio of 1 to 1 with the minor operation while the ratchet actuated by the pawl is in cycle with the complete operation with a ratio of 1 to 1. It is to be noted that the teeth on the ratchet are equal in number to the minor operations of the machine, the pawl moving the ratchet a tooth at a time for each minor operation. As shown more particularly in Figs. 1 and 3 an arm U is provided in the end of which is secured a pawl S secured therein by a set screw Z shown in dotted lines in Fig. 3. This pawl S is adjustable radially from the shaft $u$ and the end of this pawl S engages a tooth of the ratchet R upon each rotation of the pawl. A guard T is provided covering the side of the pawl and is secured to the arm U by the screws $y$. A bracket X is secured to the machine as before described and provides a bearing for the ratchet R and also for the end of the rod M and the shaft Q. As will be noted from Fig. 3 the end of the shaft Q is formed at right angles with the remainder of the shaft and is provided with a cam surface adapted to lift the plunger O. The plunger O is slidably mounted in the bracket X and is secured to the end of the rod M. On the end of the shaft Q opposite that of the upturned cam is secured the ratchet R by the slip pin Y which seats in a slot on the hub of the ratchet R as shown more particularly in the lower part of Fig. 2. The shaft journal is positioned between the upturned cam end of the shaft and the ratchet thereon so that the spring V interposed on the shaft between the shoulder of the cam and the journal boss holds the slip pin Y in the slot in the ratchet and produces friction between the ratchet and the journal. A thrust washer W is provided adjacent the upturned cam portion of the shaft and provides a seat for the spring V.

In operation the ratchet R is advanced by the pawl a tooth at a time upon each rotation of the pawl S during the interval of each minor operation so that subsequent to the prescribed number of advancements the plunger O is lifted by the cam end at Q and the rod M and the trip lever $i$ are moved sufficiently to release the collar $p$. Upon the said release of the collar, the belt is shifted by the spring I onto the idling pulley $d$ and the brake is applied to the pulley $b$ by the cam or wedge F engaging the screw G on the brake B thereby stopping the machine and holding the machine in locked position by the brake B. As hereinbefore described to allow adjustment of the machine and positioning of a new member to be operated upon therein, the lever $h$ is moved until the cam F is in the position shown in Fig. 4 which allows adjustment of the machine by movement of the belt $r$.

When the machine has been adjusted and set for another complete operation, the lever $h$ is moved to the position shown in Fig. 3 and the operation of the machine is continued as before described.

From the foregoing description, it becomes evident that this device accomplishes the objects desired and provides a machine which when set in operation will continue therein until the operation has been completed whereupon the machine is stopped and held in the stopped position. By this mechanism when the work has been placed in the machine and the machine started, the operator may leave the machine which will continue the operation until completed.

Having thus briefly described my invention, its utility and mode of operation, what I claim and desire to secure by Letters Patent of the United States is:—

1. Automatic stopping mechanism for a machine tool adapted to automatically perform a series of operations in sequence comprising the combination therewith of a driving element, a power transmitting element between the driving element and the machine tool, a brake applicable to stop movement of the machine tool, manual means for connecting the driving element with the machine tool and simultaneously disengaging the brake, a pawl on the machine tool operating in a ratio of one to one with each sequential operation of the tool, a ratchet having a number of teeth equal to the number of sequential operations of the tool engaged by the pawl once upon each operation, means actuated by the ratchet upon completion of the series of operations to disengage the driving element from the tool and simultaneously apply the brake to prevent an overrun of the machine tool.

2. In automatic stopping mechanism for machine tools, a counter shaft, a loose and a fixed pulley thereon, a drive belt for the said pulleys, a third pulley on the counter shaft, a belt thereon for driving the machine tool, a spring-pressed rod supported for longitudinal movement in parallel relation with the counter shaft and provided with means for shifting the drive belt upon movement thereof, manual means for shifting the rod from the loose to the fixed pulley to compress the spring, a locking mechanism for holding the rod with the belt on the fixed pulley, means controlled through a predetermined number of operations of the machine for releasing the rod to actuation by its spring shifting the belt from the fixed to the loose pulley, a brake mechanism for engaging the third pulley of the counter shaft to prevent overrun of the machine upon the shifting of the drive belt to the loose pulley, and means carried by the rod adapted to pivotally set the brake at the time the shift rod moves the drive belt to the loose pulley.

3. In automatic stopping mechanism for machine tools, a counter shaft, a loose and a fixed pulley thereon, a drive belt for the said pulleys, a third pulley on the counter shaft, a belt thereon by means of which the machine tool is driven, a spring-pressed shift rod supported in parallel relation with the counter shaft and provided with means for shifting the drive belt upon longitudinal movement of the rod, a brake mechanism for engaging the third pulley to prevent operation thereof, means carried on the shift rod to directly actuate the brake mechanism and stop operation of the counter shaft and of the machine tool upon movement of the shift rod to shift the belt to the loose pulley, the shift rod requiring to be moved a certain extent before the belt is shifted from the loose to the fixed pulley, a lever device on the rod by means of which the rod may be moved to release the brake mechanism before the belt is shifted from the loose pulley, said lever device providing means for shifting the rod to move the belt from the loose to the fixed pulley and compressing the spring for the rod, a latch mechanism for holding the belt on the fixed pulley, and automatic means controlled by operation of the machine tool to release the rod to action by the spring upon a predetermined number of operations of the machine tool.

4. In automatic stopping mechanism for machine tools, a machine drive having an idling element, a driving element and also a driven element connected with the machine tool, a shift rod for transferring the power to the idling or to the driving element, a brake engageable with the driven element, manual means for shifting the rod to transfer the power from the idling to the driving element, means attached to the shift rod for applying the brake when the power has been shifted to the idle element, a locking device for holding the shift rod in position with the power applied to the driving element, means controlled by the machine tool for releasing the locking device, a spring automatically forcing the shift rod to shift the power to the idling element, and manual means for shifting the rod and the brake applying means thereon to disengage the brake without transferring the power to the driving element.

5. In automatic stopping mechanism for machine tools, a driving means therefor including a belt, a loose and a fixed pulley, a spring-pressed rod for shifting the belt from the fixed to the loose pulley, manual means for moving the rod to shift the belt to the fixed pulley whereby the machine tool is operated, means for locking the rod in said last named position, a pawl rotatable on the machine tool operating in a ratio of one to one with each minor operation of the tool, a ratchet engaged by the pawl upon each rotation thereof, a cam secured to the ratchet and adapted to release the rod to action by the spring upon completion of a predetermined number of minor operations of the machine tool, and a brake for holding the machine from operation upon release of the rod to action by the spring.

WILLIAM L. KENFIELD.

Witnesses:
S. W. CALDWELL,
M. J. LESKO.